(12) United States Patent
Dayton (10) Patent No.: US 10,876,570 B1
(45) Date of Patent: Dec. 29, 2020

(54) UNIVERSAL WASHER SYSTEM

(71) Applicant: Donald Kevin Dayton, West Chester, OH (US)

(72) Inventor: Donald Kevin Dayton, West Chester, OH (US)

( * ) Notice: Subject to any disclaimer, the term of this patent is extended or adjusted under 35 U.S.C. 154(b) by 226 days.

(21) Appl. No.: 16/110,125

(22) Filed: Aug. 23, 2018

(51) Int. Cl.
*F16B 43/00* (2006.01)
*B65D 71/70* (2006.01)

(52) U.S. Cl.
CPC .................. *F16B 43/001* (2013.01)

(58) Field of Classification Search
CPC ......... F16B 43/00; F16B 43/001; B65D 71/70
USPC ........... 411/531, 532; 206/345, 338; 40/638, 40/594
See application file for complete search history.

(56) References Cited

U.S. PATENT DOCUMENTS

| 1,659,161 | A | * | 2/1928 | Richer | ................... | B21D 53/20 |
| | | | | | | 470/42 |
| 2007/0144924 | A1 | * | 6/2007 | Yamashita | ............. | B65D 71/70 |
| | | | | | | 206/338 |
| 2007/0172648 | A1 | * | 7/2007 | Harai | ......................... | C09J 7/29 |
| | | | | | | 428/343 |
| 2017/0215399 | A1 | * | 8/2017 | Cutter | ................... | A01K 87/06 |

* cited by examiner

*Primary Examiner* — Jack W Lavinder
(74) *Attorney, Agent, or Firm* — Mark F. Smith; Smith Brandenburg Ltd (57) ABSTRACT

A universal washer system providing a worker with a selection of different size washers, which a worker can select having the proper size and specification for a specific application.

17 Claims, 8 Drawing Sheets

UNIVERSAL WASHER SYSTEM

BACKGROUND OF THE INVENTION

The subject invention is directed to a universal washer system and more particularly to a universal washer system for use preferably with threaded fasteners, such as screws, bolts and the like.

Washers have often been used for threaded type fasteners, such as bolts, nuts and screws, where they are placed such that they sit along the inside surface of the head portion of the fastener where it is then pressed against the surface of an article that the fastener is being attached to. One reason a washer is often used is that it will operate to keep the fastener tightly attached to the article during use. Further, a washer operates to distribute the pressure being exerted by the fastener against the surface of the article thereby reducing the likelihood that the surface around the fastening hole in the article will be damaged when the fastener is turned during the tightening process as well as reducing wear if the fastener experiences any vibration. A washer, such as a pliable washer, is also commonly used when the surface around a fastening hole is somewhat uneven or rough allowing the inside surface of the fastener to be pressed against the smooth surface of the washer. In some applications washers have been used to reduce the likelihood that fluid will leak through the fastener hole or to prevent contamination or maintain pressure within the article. The washer operates as a seal preventing such fluid leak or contamination to occur.

One problem that is often encountered by workers who are installing fasteners, such as threaded type fasteners, is that the fastening holes vary in hole diameter and require a fastener that will properly fit with the hole diameter. Accordingly, a worker must have a variety of sized washers available to accommodate the various size fasteners and holes. This is often inconvenient when the worker is unsure of the size of a fastener needed or the diameter of the hole and the worker is not in a position to easily move to a source of washers for obtaining a proper sized washer. For example, a worker could be in the process of replacing a component that is mounted to an article by screws and wishes to simply replace the component by unscrewing one or more of the screws to remove an old component and replace it with a new component using the original screws. The worker may wish to replace an old washer with new and may not know what size of washer is needed until the fastener is removed from the old component. Accordingly, it would be desirable to have a system whereby the worker can easily select and replace the washer without having to move from the worker's present position to a source for selecting and obtaining the proper sized washer. In addition, often parts, such as replacement parts come with a plurality of fasteners and washers, such as rubber washers, to be used with the plurality of fasteners. Such parts typically come in a bag and the worker must identify which washer is to be used with a particular sized fastener. This is often difficult and time consuming when there is a substantial number of different sized fasteners. Selecting the wrong size washer for a fastener can result in fluid leakage around the fastener during operation of the part.

Accordingly an object of the subject invention is to provide a washer system that provides a worker a selection of different size washers, that allows a worker to select and obtain the proper size washer for use with a fastener, that allows a worker to easily identify and select the proper washer (formed from a washer material and having the proper adhesive) for a particular application, and clearly identifies the size of the washer and they specifications or characteristics for that particular washer.

SUMMARY OF THE INVENTION

The subject invention is directed to a universal washer system that operates to allow a worker to select and obtain a washer that is properly sized and formed from the necessary materials for a specific application. The universal washer system comprises a backing sheet having a first surface and a washer material removably mounted to the first surface. In a preferred embodiment the washer material is formed in a pattern, such as a circular pattern, having a central punch-out opening and plurality of kiss-cuts positioned concentrically outwardly from the central opening that create a plurality of washers each having a different internal diameter and which can be peeled off the backing sheet for use.

In a preferred embodiment of the invention the washer material includes an inner surface having an adhesive that operates removably attach the washer material to the first surface of the backing sheet.

In a preferred embodiment the adhesive is a pressure sensitive adhesive and operates to form a secure bond with a surface of a component of an article when placed under pressure against the surface of the component.

In a preferred embodiment the pressure sensitive adhesive is a rubber based, acrylic based or a silicon-based adhesive.

In a preferred embodiment the pressure sensitive adhesive is embedded with a PET film layer that operates to limit the stretching of the washer during tightening of a threaded fastener.

In a preferred embodiment the washer material is a rubber.

A preferred embodiment the universal washer system comprises a backing sheet having a first surface and a washer material removably mounted to the first surface, wherein the washer material is formed in a pattern having a central punch-out opening and plurality of kiss-cuts positioned concentrically outwardly from the central opening that create a plurality of washers each having a different internal diameter and which can be peeled off the backing sheet for use, wherein the washer material includes an inner surface having a pressure-sensitive adhesive that operates to removably attach the washer material to the first surface of the backing sheet and forms a secure bond with a surface of a component of an article when placed under pressure against the surface of the component, wherein the pressure sensitive adhesive is a rubber based, acrylic based or a silicon-based adhesive.

In a preferred embodiment the washer material is formed from nitrile-butadiene rubber.

In another preferred embodiment the washer material is a fluoropolymer elastomer.

In another preferred embodiment the washer material is formed from fiberglass, polytetrafluoroethylene (PTFE), polychloroprene rubber (NEOPRENE), ethylene propylene diene monomer rubber, silicone runner, fluorosilicone rubber, polyurethane rubber, styrene-butadiene rubber, butadiene rubber, polyisoprene rubber, a fluoropolymer elastomer, or a plastic polymer.

Another preferred embodiment the universal washer system comprises a backing sheet having a first surface and a washer material removably mounted to the first surface, wherein the washer material is formed to create at least one circular geometric pattern each having a central punch-out opening and plurality of kiss-cuts positioned concentrically outwardly from the central opening that create a plurality of washers each having a different internal diameter and which can be peeled off the backing sheet for use, wherein the washer material includes an inner surface having a pressure-sensitive adhesive that operates to removably attach the washer material to the first surface of the backing sheet and forms a secure bond with a surface of a component of an article when placed under pressure against the surface of the component, wherein the pressure sensitive adhesive is a rubber based, acrylic based or a silicon-based adhesive, and wherein in operation a worker identifies a component of an article having an opening for receiving a fastener, selects an appropriate universal washer system and a proper size washer, the worker removes the proper size washer by pulling the proper size washer from the backing sheet and places the washer in position such that it is pressed against the component by the fastener forming a tight seal.

Other benefits, advantages and embodiments of the present invention will become apparent to those skilled in the art to which it pertains upon a reading and understanding of the following detailed specification.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
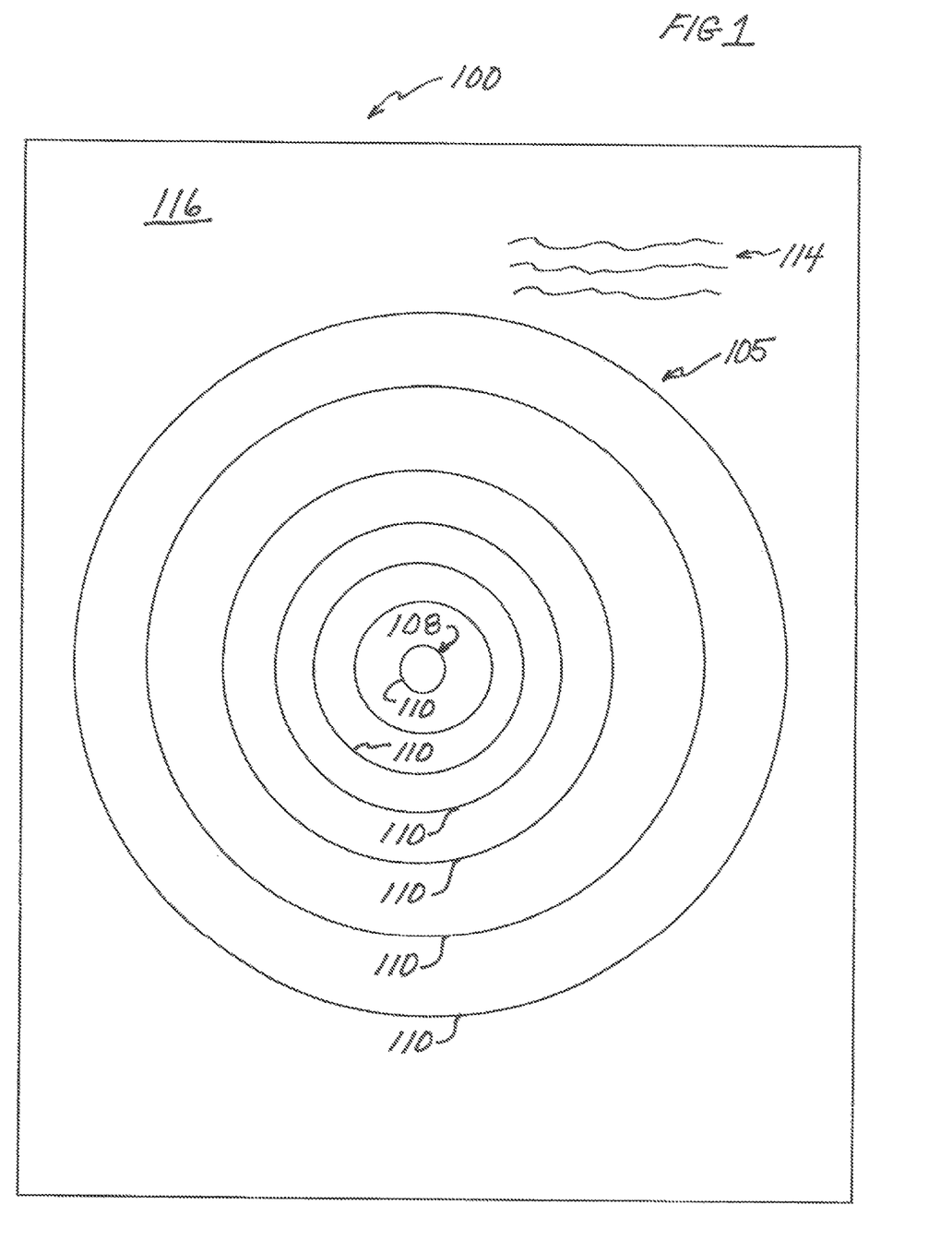
FIG. 1 is a front schematic view of the universal washer system of the subject invention showing a backing sheet having a first surface and a washer material removably mounted to the first surface, the washer material is formed having a pattern with a punch-out central opening and plurality of kiss-cuts positioned concentrically outwardly from the central opening that operate to create a plurality of peel-off washers each having a different internal diameter.
Figure 2:
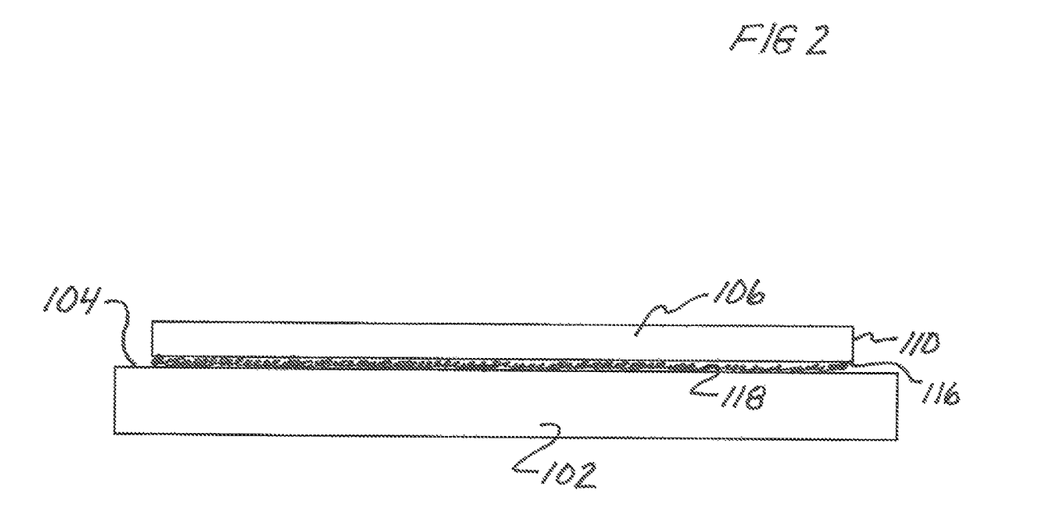
FIG. 2 is a side schematic view of the universal washer system of FIG. 1.
Figure 3:
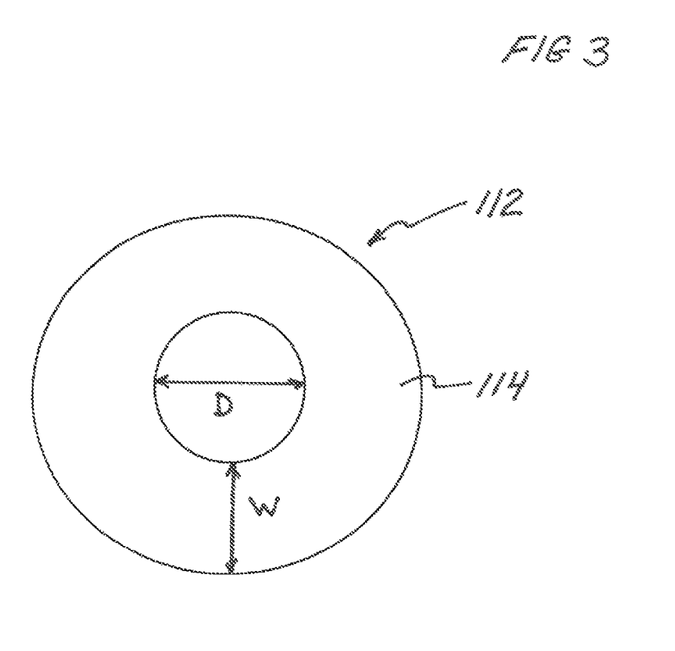
FIG. 3 is a top schematic plan view showing a washer of FIG. 1 removed from the backing sheet and having an internal diameter and width.

The subject invention is directed to a universal washer system that operates to allow a worker to select and obtain a washer that is properly sized and formed using materials suitable for a specific application. Referring to FIGS. 1-3, the universal washer system 100 of the subject invention is shown having a backing sheet 102 that operates as a release surface with a first surface 104 and washer material 106 removably mounted to the first surface 104. In a preferred embodiment the washer material 106 is formed having a pattern 105 with a central punch-out opening 108 and a plurality of kiss-cuts 110 that go through the washer material 106 but not the backing sheet 102. The kiss-cute 110 are positioned concentrically outwardly from the central opening 108 and function to create a plurality of peel-off washers 112 each having a different internal diameter D and which can be individually peeled off the backing sheet 102 leaving the other washers in place on the backing sheet 102. It should be understood that the pattern 105 can be of any geometric pattern, such as a circular pattern as illustrated, but can be other patterns such as square, rectangular, oval, triangular or other shapes.

Preferably the central opening 108 has a selected diameter D and the circular kiss-cuts 100 extend concentrically outwardly from the central opening 108 creating a series of peel off washers 112 each having a different internal diameters D and the same or different widths W. In one preferred embodiment, the central opening 108 has a diameter of about 3.175 mm (⅛ in) and a plurality of kiss-cutes 100 creating four washers 112 each have a width W of about 3.175 mm (118 in), one having a width W of about 8.35 mm (¼ in) and one having a width W of about 9.525 mm (⅜ in). In a preferred embodiment the selected widths of the peel-off washers are sized to be used with typical English sized fasteners. However, it should be understood that the selected widths of the peel-off washers can also be sized to be used with typical metric sized fasteners. Further, the subject invention is not limited to a particular number and size of washers and the number and size of the washers can be varied as desired by increasing or decreasing the number and spacing of the kiss-cuts forming the individual washers.

Figure 4:
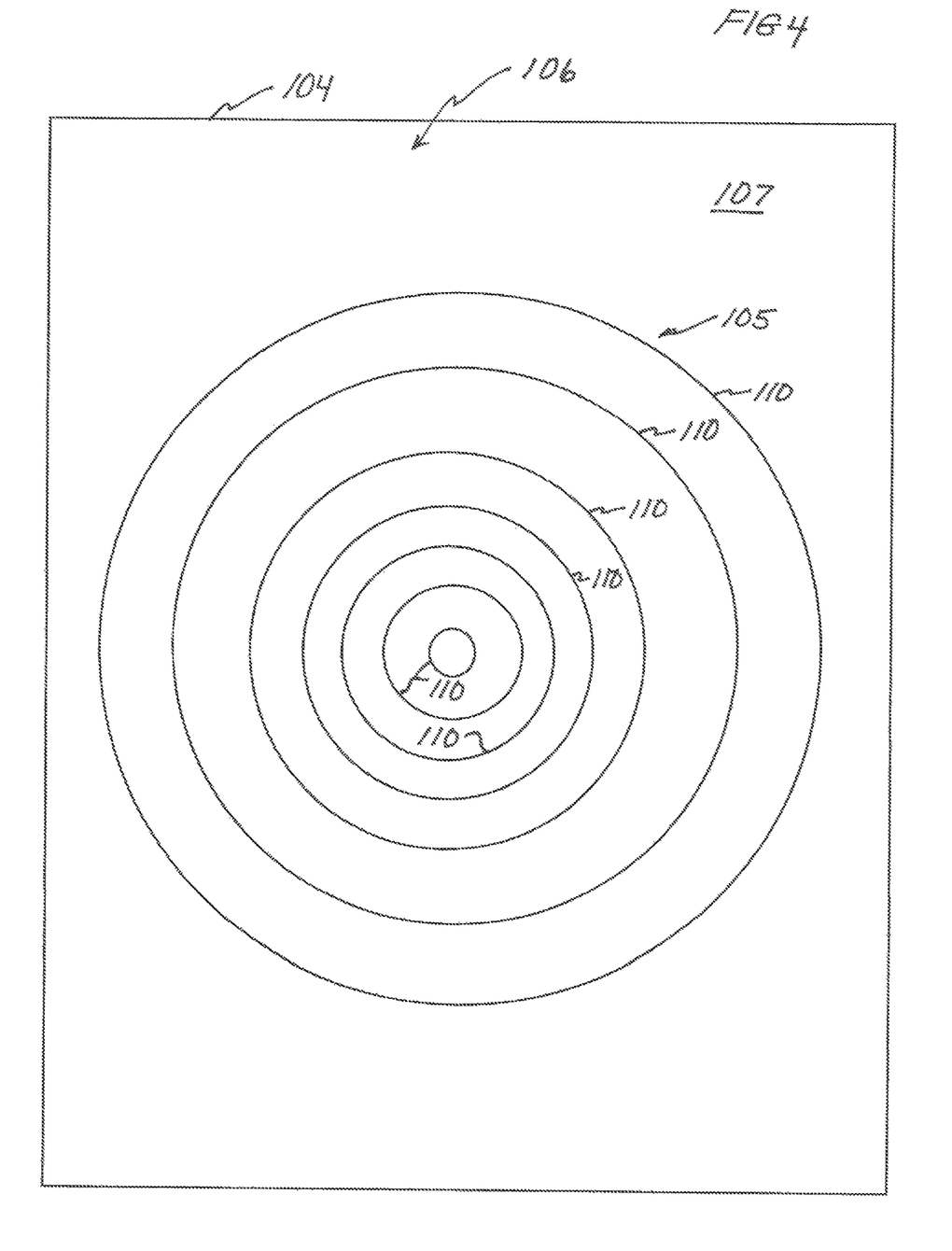
FIG. 4 is a schematic top view of a preferred embodiment of the universal washer system of the subject invention showing the washing material having washing material areas that can be used by a worker for cutting the washer material into desired shapes.

As illustrated in FIG. 4, the washer material 106 having additional washer material areas 107 available to allow a worker to cut, such as with a razor blade or cutting knife, additional material in various shapes for various purposes. In another preferred embodiment, as illustrated in FIG. 1, a portion of the first surface 104 of the backing sheet 102 includes one or more open areas 116 that the washer material is not disposed, that can be used to display information about the peel-off washers. For a non-limiting illustration, the display information may include indicia 114 relating to the use of the washer such as environmental operating limits, types of fasteners (i.e., English or metric sized fasteners) that the washers are sized to accommodate, the type of washer material, the adhesive used, and the like. It should also be understood that the reverse side of the backing sheet may also be imprinted with information.

Figure 5:
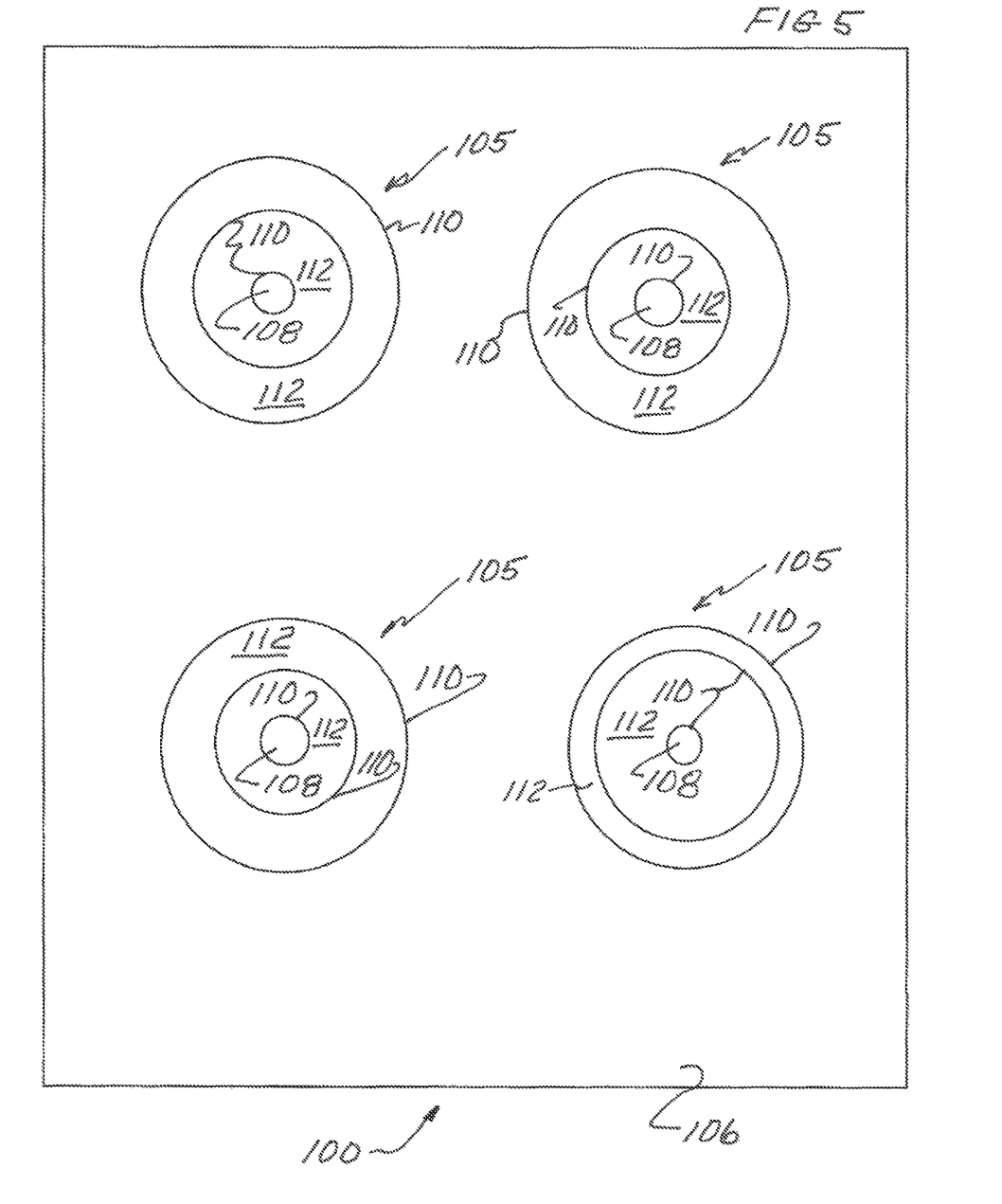
FIG. 5 is a schematic top view of another preferred embodiment of the universal washer system of the subject invention having washer material with a number of geometric patterns each with a punch-out central opening and plurality of kiss-cuts positioned concentrically outwardly from the central opening that operate to create a plurality of peel-off washers each having a different internal diameter.
Figure 6:
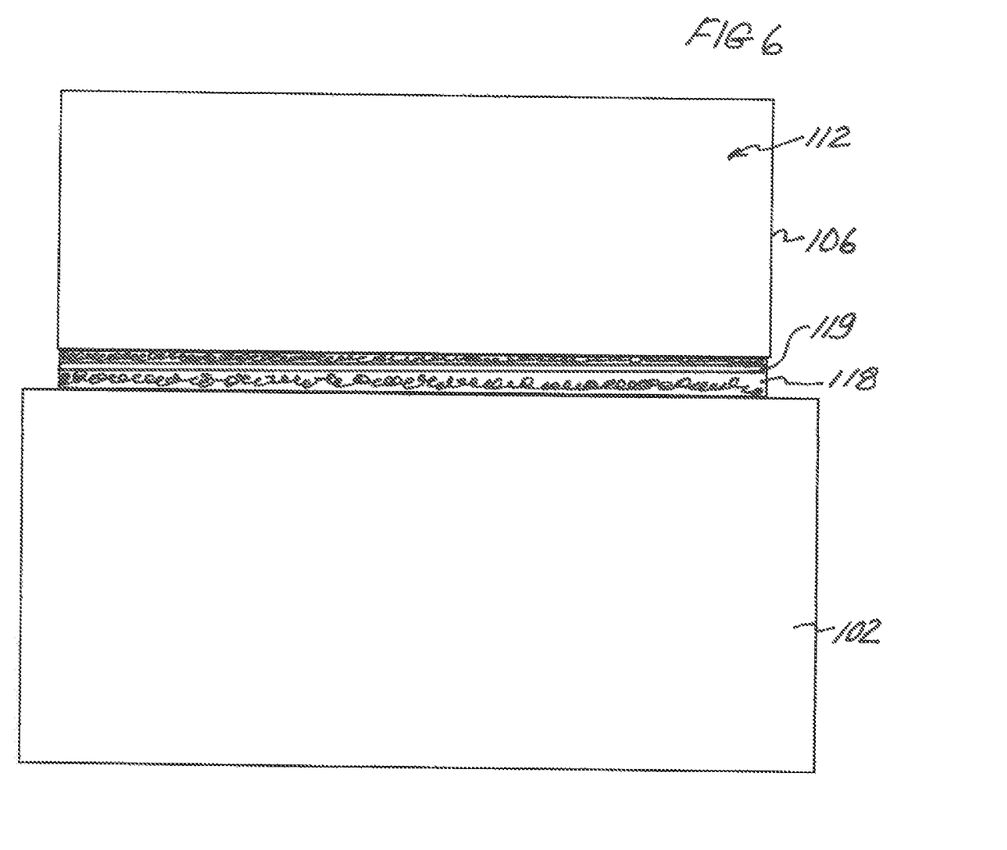
FIG. 6 is a side schematic view of another preferred embodiment of the subject invention showing the washer having a pressure sensitive adhesive thereon with an embedded PET film layer that operates to limit the stretching of the washer during tightening of a threaded fastener.

In another preferred embodiment of the invention, as illustrated in FIG. 5, the washer material 106 has a number of patterns 106 each with a punch-out central opening 108 and plurality of kiss-cuts 110 positioned concentrically outwardly from the central opening 108 that operate to create a plurality of peel-off washers 112 each having a different internal diameter. It should be understood that the number of geometric patterns can vary. For a non-limiting illustration, the number of geometric patterns can be selected such that a plurality of washers created having the same internal diameters can be on one backing sheet. In this way, if a number of washers of a certain size are desired, the number of patterns can be placed on the backing sheet to create the desired number of washers of the desired size.

The washer material is preferably formed from a rubber material such as a nitrile-butadiene rubber. However, it should be understood that the washer material can be other flexible, elastic materials, such as but not limited to fiberglass, polytetrafluoroethylene (PTFE), polychloroprene rubber (NEOPRENE), ethylene propylene diene monomer rubber, silicone rubber, fluorosilicone rubber, polyurethane rubber, styrene-butadiene rubber, butadiene rubber, polyisoprene rubber, fluoropolymer elastomer or a plastic polymer. It should be understood that the washer material is not limited to the washer materials identified herein and that other washer materials may be utilized. The particular washer material is determined by the particular application of the washers and the particular washer material to be utilized can be easily selected based on the application and environmental conditions that the washer will experience.

As illustrated in FIG. 2, the washer material 106 includes an inner surface 118 having a pressure sensitive adhesive 118 that operates to removably attach the washer material 106 to the first surface 104 of the backing sheet 102. The backing sheet 102 operates as a release sheet for allowing individual washers 112 to be peeled off the backing sheet 102 and attached to the inside surface of a fastener. There are numerous types of adhesives available which employ the concept of applying it to the surface of an object that one later mount to another surface. These adhesives are generally referred to as pressure sensitive adhesives. Thus, one function of the adhesive is to simultaneously adhere to both the first surface of the backing sheet and the inner surface of the washer material. Preferably, the pressure sensitive adhesive is a rubber, acrylic or silicone-based adhesive that provide sufficient tack and adhesion properties. It should be understood that the particular pressure sensitive adhesive is selected based on the particular apparatus and conditions that the fastener is attaching to. For example, rubber adhesives generally do not perform as well as other adhesives in extreme heat, and possesses only an average resistance to chemicals, UV damage and oxidation. Whereas acrylic based adhesives generally are able to be re-positioned, because they have a low initial bond strength, which builds over time, and have good resistance to chemical, UV and oxidation exposure at high temperature conditions, whereas silicone-based adhesives operate well at temperature conditions. It should be understood that the adhesive material is not limited to the types identified herein and that other types of adhesives may be utilized and is determined by the particular application of the washers and the particular adhesive to be utilized can be easily selected by one skilled in the art based on the application and environmental conditions that the washer will experience. In another preferred embodiment, as illustrated in FIG. 7, the pressure sensitive adhesive 118 is embedded with a PET film layer 119 that operates to limit the stretching of the washer during tightening of a threaded fastener.

Figure 7:
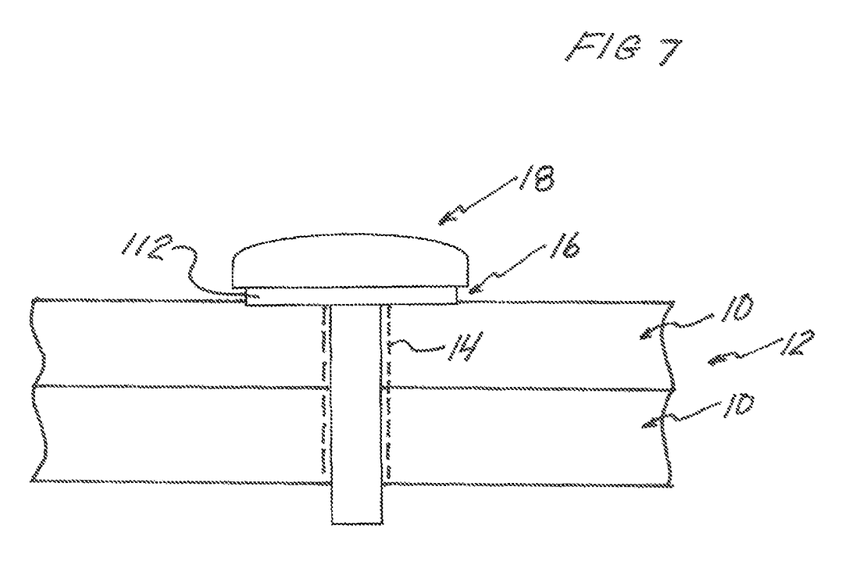
FIG. 7 is a side schematic view showing a fastener showing a washer of the universal washer system of the subject invention positioned along the inside surface of the head of a fastener.
Figure 8:
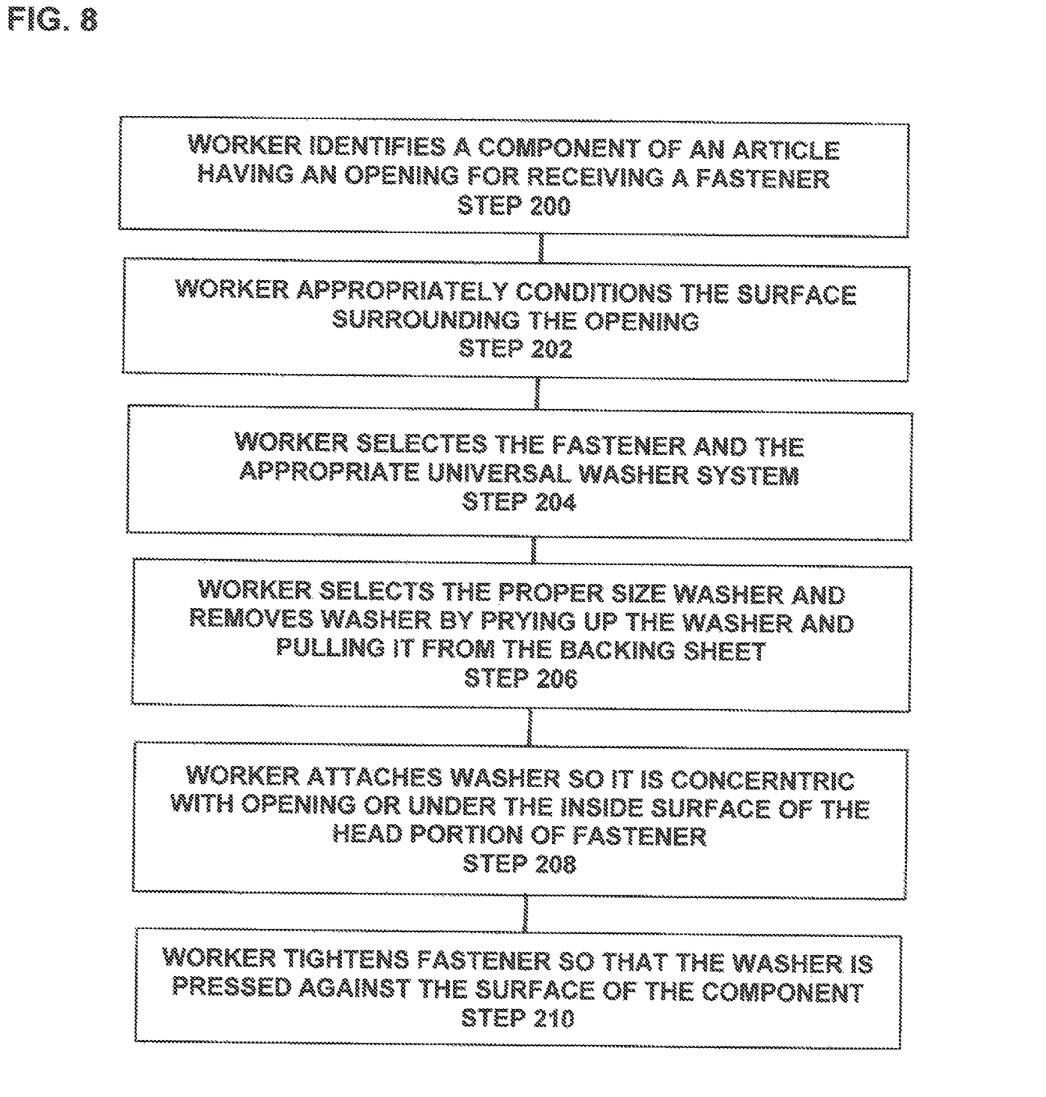
FIG. 8 is a flowchart showing the methodology of using the universal washer system of the subject application for use with a fastener for attaching to a component of an article.

In use, as illustrated in FIGS. 7 and 8, the universal washer system of the subject invention operates whereby a worker identifies a component 10 of an article 12 having an opening for receiving a fastener, such as a threaded fastener 10, through an opening 14 (Step 200). The worker appropriately conditions the surface 18 surrounding the opening 14, such as removing dirt and debris, sanding the area to make it smoother or to remove rust, and other similar surface treatments (Step 202). Once the worker has selected the fastener 18 to be used and the area surrounding the opening 14 has been appropriately conditioned, the worker selects the appropriate universal washer system 100 (Step 204). It should now be understood that the appropriate universal washer system is the system that has a peel-off washer 112 that is sized (has the appropriate internal diameter D and width W) for use with the selected fastener 18 and that the washer material and adhesive are formed from materials that will operate properly under the expected environment and operating conditions that the washer will experience. For a non-limiting example, if the washer will be working in an environment that will expose the washer to various types of oils and relative high temperatures versus operating in a dry environment and relative low temperatures. The worker can select the appropriate washer system by reading the information printed on the one or more areas on the first surface of the backing areas or on the reverse side of the backing sheet. Once the worker has selected the appropriate universal washer system, the worker selects the proper size washer for the selected fastener and removes the washer by prying up the edge of the washer, such as with a finger or other device, and pulling the washer away from the backing sheet (Step 206). The worker can then attach the washer to the surface for receiving the fastener such that the washer is concentric with the opening and the adhesive on the washer holds the washer in place or can attach the washer to the inside surface of the head portion of the fastener (Step 208). The fastener is then inserted into the opening and turned such that the fastener presses against the washer forming a tight seal (Step 210).

It should now be apparent to one skilled in the art that the universal washer system of the subject invention provides a washer system that provides a worker a selection of different size washers, that allows a worker to select and obtain the proper size washer for an application, and clearly identifies the size of the washer and they specifications or characteristics for that particular washer.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein. While the universal washer system described herein constitutes a preferred embodiment of this invention, it is to be understood that other preferred embodiments, as disclosed herein, and variations thereto may be made without departing from the scope of the invention which is defined in the appended claims.

The invention claimed is:
1. A universal washer system comprising:
 a backing sheet having a first surface and a washer material removably mounted to the first surface;
 wherein said washer material has one or more patterns each with a central punch-out opening and plurality of kiss cuts that go through said washer material but not said backing sheet and wherein said kiss cuts are positioned concentrically outwardly from said central punch-out opening to create a plurality of concentric washers each having a different internal diameter and whereby one concentric washer can be peeled off said backing sheet for use while leaving the remaining said plurality of concentric washers attached to said backing sheet.

2. The universal washer system of claim 1 wherein said pattern is a circular pattern.

3. The universal washer system of claim 1 wherein said washer material includes an inner surface having an adhesive that operates to removably attach said washer material to said first surface of said backing sheet.

4. The universal washer system of claim 3 wherein said adhesive is a pressure sensitive adhesive that operates to form a secure bond between one of said plurality of washers and a surface of a component of an article when said one washer is placed under pressure against the surface of the component.

5. The universal washer system of claim 3 wherein said adhesive is a rubber based, acrylic based or a silicon-based adhesive.

6. The universal washer system of claim 3 wherein said adhesive is embedded with a PET film layer.

7. The universal washer system of claim 1 wherein said washer material is a rubber.

8. The universal washer system of claim 1 wherein said washer material is formed from nitrile-butadiene rubber.

9. The universal washer system of claim 1 wherein said washer material is formed from fiberglass, polytetrafluoroethylene (PTFE), polychloroprene rubber (NEOPRENE), ethylene propylene diene monomer rubber, silicone rubber, fluorosilicone rubber, polyurethane rubber, styrene-butadiene rubber, butadiene rubber, polyisoprene rubber, a fluoropolymer elastomer or a plastic polymer.

10. A universal washer system comprising:
   a backing sheet having a first surface and a washer material removably mounted to the first surface;
   wherein said washer material includes at least one pattern each having a central punch-out opening and a plurality of kiss-cuts that go through said washer material but not said backing sheet and wherein said kiss cuts are positioned concentrically outwardly from said central punch out opening to create a plurality of concentric washers each having a different internal diameter and whereby one concentric washer can be peeled off the backing sheet for use while leaving the remaining said plurality of concentric washers attached to said backing sheet;
   wherein said washer material includes an inner surface having a pressure-sensitive adhesive that operates to removably attach said washer material to said first surface of said backing sheet and forms a secure bond between one of said plurality of washers and a surface of a component of an article when said one washer is placed under pressure against the surface of the component; and
   wherein said pressure sensitive adhesive is a rubber based, acrylic based or a silicon-based adhesive.

11. The universal washer system of claim 10 wherein said pressure sensitive adhesive is embedded with a PET film layer.

12. The universal washer system of claim 10 wherein said washer material is formed from nitrile-butadiene rubber.

13. The universal washer system of claim 10 wherein said washer material is formed from fiberglass, polytetrafluoroethylene (PTFE), polychloroprene rubber (NEOPRENE), ethylene propylene diene monomer rubber, silicone runner, fluorosilicone rubber, polyurethane rubber, styrene-butadiene rubber, butadiene rubber, polyisoprene rubber, a fluoropolymer elastomer or a plastic polymer.

14. A universal washer system for use by a worker who has identified a component of an article having an opening in the surface of the component for receiving a fastener and who has selected a proper size washer, the universal washer system comprising:
   a backing sheet having a first surface and a washer material removably mounted to the first surface an adhesive;
   wherein said washer material includes one or more patterns each having a circular geometric shape with a central punch-out opening and plurality of kiss-cuts positioned concentrically outwardly from the central punch-out opening to create a plurality of concentric washers removably mounted to said first surface by said adhesive each having a different internal diameter and which can be peeled off the backing sheet for use;
   wherein said pressure-sensitive adhesive further operates to form a secure bond with a surface of a component of an article when placed under pressure against the surface of the component;
   wherein said pressure sensitive adhesive is a rubber based, acrylic based or a silicon-based adhesive; and
   wherein in operation one of said plurality of washers is removed by pulling said one of said plurality of washers from said backing sheet and places said one of said plurality of washers in position such that it is pressed against the surface of the component by the fastener forming a tight seal.

15. The universal washer system of claim 14 wherein said pressure sensitive adhesive is embedded with a PET film layer.

16. The universal washer system of claim 14 wherein said washer material is formed from nitrile-butadiene rubber.

17. The universal washer system of claim 14 wherein said washer material is formed from fiberglass, polytetrafluoroethylene (PTFE), polychloroprene rubber (NEOPRENE), ethylene propylene diene monomer rubber, silicone runner, fluorosilicone rubber, polyurethane rubber, styrene-butadiene rubber, butadiene rubber, polyisoprene rubber, a fluoropolymer elastomer or a plastic polymer.

* * * * *